United States Patent [19]

Shulman

[11] Patent Number: 5,622,556

[45] Date of Patent: *Apr. 22, 1997

[54] LIGHTWEIGHT, LOW WATER CONTENT CEMENTITIOUS COMPOSITIONS AND METHODS OF THEIR PRODUCTION AND USE

[76] Inventor: David M. Shulman, 7445 S. Milwaukee Way, Littleton, Colo. 80122

[*] Notice: The term of this patent shall not extend beyond the expiration date of Pat. No. 5,580,378.

[21] Appl. No.: 537,466

[22] Filed: Oct. 2, 1995

Related U.S. Application Data

[63] Continuation-in-part of Ser. No. 358,858, Dec. 19, 1994.

[51] Int. Cl.⁶ ................................................. C04B 16/08
[52] U.S. Cl. ..................... 106/677; 106/679; 106/676; 106/705; 106/708; 106/709; 106/710; 106/711; 106/724; 106/717; 106/792; 106/819; 106/823; 106/DIG. 1; 524/2; 524/650; 264/241; 264/299; 264/333
[58] Field of Search ......................... 106/672, 677, 106/679, 676, 705, 708, 709, 710, 711, 724, 717, 792, 819, 823, DIG. 1; 264/45.1, 228, 241, DIG. 7, DIG. 49, 299, 333; 524/2, 650; 52/102, 218, 223.6, 596, 604, 606

[56] References Cited

U.S. PATENT DOCUMENTS

| | | |
|---|---|---|
| 4,047,962 | 9/1977 | Copeland . |
| 4,104,077 | 8/1978 | Kobayashi . |
| 4,210,457 | 7/1980 | Dodson et al. . |
| 4,306,395 | 12/1981 | Carpenter ........................ 428/402 |
| 4,704,415 | 11/1987 | Pierce et al. . |
| 4,828,619 | 5/1989 | Matshushita et al. . |
| 4,905,439 | 3/1990 | Filteau ............................ 106/672 |
| 4,906,298 | 3/1990 | Natsuume et al. . |
| 4,992,102 | 2/1991 | Barbour . |
| 5,114,487 | 5/1992 | Gartshore . |
| 5,207,830 | 5/1993 | Cowan . |
| 5,266,111 | 11/1993 | Barbour . |
| 5,269,975 | 12/1993 | Noakes ............................ 106/705 |
| 5,352,288 | 10/1994 | Mallow . |
| 5,352,390 | 10/1994 | Hilton et al. .................... 428/402 |

OTHER PUBLICATIONS

Kosmatka; Design And Control Of Concrete Mixtures; 1988; p. 64 (no month).

*Primary Examiner*—Mark L. Bell
*Assistant Examiner*—Michael Marcheschi

[57] ABSTRACT

An improved lightweight cementitious product made up of an aqueous cementitious mixture that can incorporate fly ash, portland cement, sand, lime, and the weight saving component, which is micronized polystyrene particles having particle sizes in the range of 50 to 2000 microns, and characterized by having very low water contents, in the range of from about 0.5% to 5% v/v. The ultra low water compositions can be extruded and can be molded under high pressure.

35 Claims, No Drawings

LIGHTWEIGHT, LOW WATER CONTENT CEMENTITIOUS COMPOSITIONS AND METHODS OF THEIR PRODUCTION AND USE

This application is a continuation in part of prior application Ser. No. 08/358,858, filed Dec. 19, 1994, now pending.

FIELD OF THE INVENTION

The present invention provides novel compositions, methods of their use and methods of their manufacture, such compositions generally useful as agents in the construction and building trades. More specifically, the compounds of the present invention can be used in construction and building applications that benefit from a relatively lightweight, extrudable, moldable, pourable cementitious material that has high strength, good insulation properties and vermin resistance properties. At the present time, there is a need in the area of construction and building for such agents.

BACKGROUND OF THE INVENTION

In the field of preparation and use of lightweight cementitious materials, such as so-called lightweight concrete, the materials that have been available to the trades up until now have generally required the addition of various constituents to achieve a strong but lightweight concrete mass that has a high homogeneity of constituents and which is uniformly bonded throughout the mass. Of the methods known to the inventor, there have been several patents issued relating to the inclusion of expanded polystyrene beads of an average bead size of about 20 mm diameter (about 20,000 microns) that are expanded by various heating methods either before the beads are introduced into the concrete mixture, or expanded after they have been added to the concrete mixture. It is an object of this invention to provide for a pourable, lightweight cementitious mixture that does not rely on expanded polystyrene for weight saving properties and strength. It is another object of the present invention to provide for a pourable, lightweight cementitious mixture that can be used in the construction of molded roofing tiles. It is yet another object of the present invention to provide for a pourable, lightweight cementitious mixture that can be used in the construction of laminated building foundations. It is yet another object of the present invention to provide for a pourable, lightweight cementitious mixture that resists insect infestation and deterioration. Yet another object of the present invention is to provide for an extrudable cementitious mixture that can be extruded through various extrusion dies and can be cured without further shape manipulation or formation. Still another object of the invention is to provide for a cementitious mixture that can be molded under high pressure and readily ejected from the mold with a minimum of green time to enable rapid recycling of the mold.

The present invention achieves these objectives through the use of micronized particulates of polystyrene in a cementitious mixture composition having very low water concentrations.

SUMMARY OF THE INVENTION

The invention comprises lightweight load bearing cementitious compositions having an overall water content of from 0.005% to 10% by volume, that yield building materials having a density of 90 to 145 lb/ft$^3$, comprising from 40 to 99% by volume of aqueous cementitious mixture and from 1 to 60% by volume of micronized polystyrene foam particles, the foam particles having a minimum density of 1.0 lb/ft$^3$, and the water content of the aqueous cementitious component being present in a range of from 0.005 to 5% by volume.

DESCRIPTION OF THE PREFERRED EMBODIMENTS

The term "aqueous cementitious mixture" refers to any of a number of compositions comprising water, a cement material, and one or more fillers or adjuvants that form a slurry that hardens upon curing. Cement materials include hydraulic cements, gypsum, lime, and the like. Adjuvants and fillers include sand, clay, fly ash, aggregate, air entrainment agents, colorant agents and so forth. The compositions of the invention include a class of low water weight cement mixtures that have only from about 0.005 to 5% v/v of water added to the final mix. Such low water compositions have surprisingly been found to produce plastic cement mixtures that are readily processed through an extrusion die into a shape that needs no additional manipulation or molding after having been cut off subsequent to exiting the extrusion die. Also, the low water content compositions are well suited to being molded under high pressure (e.g. in the range of five hundred to five thousand lb/in$^2$). The advantage of such high pressure molding operations is that after removing the pressure, the molded article can be ejected from the mold very quickly, usually after three to five minutes or so, thereby allowing the mold to be available for another cycle of molding another article. Ordinarily, when a plastic composition is being shaped in a mold, there is some period of time that the composition must remain in the mold until it has sufficiently hardened to at least remove it from the mold, a period known in the trade as 'green time'. The longer the green time of a given composition being used to mold articles, the fewer times the mold itself can be cycled during a work day. The extrusion and high pressure molding techniques and apparatus used in fabricating products out of the compositions of the invention are well known to those of ordinary skill in the art, and do not form a separate part of the invention as claimed herein, except to the limited extent they are a final step in the process of making articles out of the compositions of the invention. The compression stage of working with the compositions of the invention causes the material to be compressed down to approximately one third of its original volume. It has been found that articles molded out of these compositions lose the brittle quality of most molded cement or concrete compositions. For example, a roof tile pressure molded or extruded from these compositions doesn't shatter if dropped on the floor from a height of about three to four feet.

The term "cement" is used herein in the sense of the material that bonds a concrete or other :monolithic product, not to the final product itself. Hydraulic cement undergoes a hydration reaction in the presence of a sufficient quantity of water that produces the final hardened product. The following are some typical hydration reactions:

$$Ca_3Al_2O_6 + 6H_2O \rightarrow Ca_3Al2(OH)_{12};$$

$$Ca_2SiO_4 + xH_2O \rightarrow Ca_2Si)_4 \cdot xH_2O;$$

$$Ca_3SiO_5 + (x+1)H_2O \rightarrow Ca_2SiO_4 \cdot xH_2O + Ca(OH)_2.$$

The most preferred hydraulic cement for use in the invention is portland cement. Various embodiments of the invention call for the addition of lime (calcium oxide) which is itself also a hydraulic cement.

Micronized polymeric particles comprise the weight saving component of the present invention, and can be polystyrene, polyester, polyethylene, polypropylene, acrylic, polyisocyanurate, polyacrylamide, polyacrylimide, mixed imide-amides arylamides, arylimides and the like. Also within the contemplation of the invention is the use of saw dust and wood pulp. The most preferred material is polystyrene. Micronized polystyrene foam particulates are the result of a process of shredding virgin polystyrene foam, and give the final product its lightweight characteristics. The most preferred form of micronized polystyrene foam particulates is made up of virgin polystyrene foam of approximately 1 lb/ft$^3$ density and particularly having a minimum density of 1lb./ft$^3$ that has been treated with a borate. The borate acts as a potent insect repellant, tending to keep vermin insects away from the rest of the structure of the building that incorporates such borate-containing cement compositions. Such foam block is then shredded to provide the micronized particles which have substantially irregular surfaces. A particularly well suited method of shredding is by running an electrified fine gauge wire through solid blocks of this foam, according to methods well known to those of ordinary skill in cutting and fabricating such polystyrene foam blocks. Alternatively, a wire brush can be used to brush against and abrade a solid foam block, thereby producing the desired small particulates of foam. This type of product is also generally available as a waste by-product ("fines") at facilities that cut virgin polystyrene loam block. This process produces micronized foam particulates that can be characterized by sieve analysis in general conformance with ASTM C 136, entitled "Sieve Analysis of Fine and Coarse Aggregates". Such method of analysis is suitable for particles of from 50 to 5,000 microns in size. The micronized foam particles preferably have an average diameter of approximately 1 to 5000 microns, more preferably have an average diameter of approximately 50 to 2000 microns, and even more preferably have an average diameter of aproximately 600 to 1200 microns. A typical sample yielded the following sieve analysis:

| Sieve Size | Sieve Opening (in microns) | Polystyrene % Passing |
|---|---|---|
| No. 4 | 4760 | 100 |
| No. 8 | 2380 | 99 |
| No. 10 | 2000 | 99 |
| No. 16 | 1260 | 80 |
| No. 30 | 590 | 34 |
| No. 50 | 297 | 8 |
| No. 100 | 149 | 2 |
| No. 200 | 74 | 1 |

From this analysis, it can be seen that the micronized polystyrene foam particulates preferred in the invention can be characterized as a coarse to moderately coarse powder, as those terms are used in the science of theology, having a median particle size of approximately 800 microns. Micronized foam of this type is available from the R-Control Co. of Denver, Colo., and other major cities or from Poudre Plastics of Fort Collins, Colo.

Fly ash can be used as a partial replacement for portland cement in concrete construction, and it is generally accepted that the proportion of portland cement replaced by the usual fly ash should not exceed about 20% to avoid significant reduction in the compressive strength or the resultant concrete. Fly ash components of the cementitious mixtures of the invention can be either C-type or F-type fly ash. Fly ash is the very finely divided ash produced by the combustion of anthracite and bituminous coal in large industrial coal-fired boilers, especially for the steam generation of electricity, that is suspended in the flue gases from such boilers and is separated therefrom by means such as electrostatic precipitation. This fly ash is an extremely finely divided material generally in the form of spherical bead-like particles, with at least 70% by weight passing a 200 mesh sieve and has a generally glassy state, resulting from fusion or sintering during combustion. As recognized in the American Society of Testing Materials (ASTM) specification designation C618-85 entitled "Fly Ash and Raw or Calcined Natural Pozzolan for Use as a Mineral Admixture in Portland Cement Concrete", fly ash is subdivided into two distinct classifications; namely, Class F and Class C. The definitions of these two classes are as follows: "Class F-Fly ash normally produced from burning antharacite or bituminous coal that meets the applicable requirements for this class as given herein. This class fly ash has pozzolanic properties. Class C-Fly ash normally produced from lignite or subbituminous coal that meets the applicable requirements for this class as given herein. This class of fly ash, in addition to having pozzolanic properties, also has some cementitious properties. Some Class C flyashes may contain lime contents higher than 10%." The reference to "pozzalanic properties" refers to the capability of certain mixtures, which are not in themselves cementitious, of undergoing a cementitious reaction when mixed with lime (calcium oxide) in the presence of water. Class F Fly-ashes can have from 4 to 9% calcium oxide contents, while Class C Fly-ashes can have from 30 to 60% calcium oxide contents. For this reason, Class C fly ash possesses direct cementitious properties as well as pozzolanic properties. Fly ash is readily available from local building products outlets. Fly ash that has been de-limed, which is called for in several embodiments of the cementitious compositions of the present invention, is also readily commercially available from a variety of local sources.

The presence of an air entraining agent helps to create air cells or voids in a batch of concrete, which can help to maintain good workability of fresh concrete and also improve the durability to freezing and thawing of hardened concrete. AIR ENTRAINMENT® brand of air entraining resin is the trademark of a proprietary high grade tree sap preparation that is preferentially included in some embodiments of the present invention, being used to entrap small air bubbles in cementitious compositions when desired. Other air entrainment agents include anionic surfactants such as polyoxyethylene alkyl ether sulfates or polyoxyethylene alkly phenyl ether sulfates or salts thereof, polyoxyethylene alkyl ether phosphates or polyoxyethylene alklyl phenyl ether phosphates or salts thereof, alkylbenzenesulfonic acids or salts thereof, alpha-olefinic-sulfonic acids or salts thereof, fatty acids or salts thereof, polyoxyethylene polyalcohol fatty acid esters, polyethylene glycol fatty acid esters, polyoxyethylene pentaerythryritol fatty acid esters and polyoxyethylene sorbitan fatty acid esters and the fatty acids or salts thereof.

Sand is frequently used to expand the volume of cementitious mixtures. Sand used in the cementitious mixtures of the present invention include play sand whether from beach or river sources, and silica sand. Clay is a suitable alternative for sand in the mixtures of the invention.

As a means of reinforcing the final cured product, reinforcement fibers can be added to the cementitious mixtures of the invention. Such fibers act as reinforcing components, having a large aspect ratio, that is, their length/diameter ratio is high, so that a load is transferred across potential points of fracture. Typical preferred materials are fiber glass strands of approximately one to one and three fourths inches in length, although any material can be used that has a higher Young's modulus than the matrix of the cementitious material. Another preferred fiber are commercially available from the Fibermesh company of Chatanooga, Tenn., and are comprised of polypropylene fiber. In those embodiments of the invention that include the use of reinforcing fibers, the final molded product often displays a hair-like external appearance. Such extraneous fiber hairs can be burned off with a suitable torch.

Densities of hardened final products using the compositions of the present invention can vary from 60 to 115 lb/ft$^3$, and more preferably from 70 to 90 lb/ft$^3$ with many products being about 80 lb/ft$^3$. Preferred mixtures of the cementitious products of the invention can have a cementitious mixture present in a range of from 35 to 75% by volume and more preferably 50 to 60% by volume and micronized polystyrene foam particles present in a range of from 25 to 60% by volume, and more preferably 40 to 50% by volume.

The compositions of the invention are well suited to the fabrication of molded construction materials, especially roofing tiles and foundation walls. The compositions are easier to pour than regular weight mixtures and exhibit greater strength. The compositions can be readily cast into molds according to methods well known to those of skill in the art for roofing tiles in virtually any three dimensional configuration desired, including configurations having certain topical textures such as having the appearance of wooden shakes, slate shingles or smooth faced ceramic tiles. A typical shingle can have approximate dimensions of ten inches in width by seventeen inches in length by one and three quarters inches in thickness. In the molding of roofing materials, the addition of an air entrainment agent makes the final product more water resistant.

When foundation walls are poured using the lightweight cementitious compositions of the invention, the walls can be taken above grade due to the lighter weight. Ordinarily, the lower part of the foundation wall has a tendency to blow outwards under the sheer weight of the concrete mixture, but the lighter weight of the compositions of the invention tend to lessen the chances of this happening. Foundation walls prepared using these compositions can readily take conventional fasteners used in conventional foundation wall construction. A particularly preferred type of foundation wall construction calls for the use of foam plastic walls to form a sandwich containing the poured lightweight concrete. After hardening, the foam walls are left intact to add significantly to the insulation properties of the foundation walls. Such walls can be made of extruded polystyrenes or the like, and frequently are available to contractors in preformed wall and corner units that snap or clip together, according to methods well known to those in the construction trades.

Additionally, the cementitious compositions of the invention can be used as a stucco or as a plaster, being applied by any means well known to those of ordinary skill in those trades; as a wall board, of the sandwich type of construction wherein the hardened material is sandwiched by suitably strong paper or other construction material; as pavers for sidewalks, driveways and the like; as a pour material for sidewalks, driveways and the like; as a monolithic pour material for floors of buildings; as chimney stacks or smoke stacks; as bricks; as fire bricks for fireplaces and the like; as roof pavers; as monolithic pour material for radiant heat floor systems; as blocks for landscape retaining walls; as prestressed concrete wall systems; as tilt-up wall systems, i.e. where a wall component as poured on site and then tilted up when hardened; and as mason's mortar.

The most preferred compositions of the invention are any or all of those specifically set forth in the following examples. These compositions are not, however, to be construed as forming the only genus that is considered as the invention, and any combination of the compositions' components may itself form a genus. The following examples further illustrate details for the preparation of the compositions of the present invention. Those skilled in the an will readily understand that known variations of the conditions and processes of the following preparative procedures can be used to prepare these compositions.

In each of the following examples, the mixes are prepared at a temperature of approximately 40° F. or above. In the following examples, measurements, unless noted otherwise, are given as parts of volume to volume measures, abbreviated as v/v.

Strength tests were conducted according to the ASTM C 39 protocol, the text of which is incorporated herein by reference. Fire tests are conducted according to ASTM E 108 and ASTM C 518 and the ICBO Class A Fire Test, the text of which is incorporated herein by reference.

EXAMPLE 1

A cementitious composition is prepared by mixing the following components under the following conditions:
4 parts v/v of F-type fly ash that has been de-limed.
4 parts v/v lime.
9 parts v/v Portland cement.
6 parts v/v play sand.
24 parts v/v micronized polystyrene foam particles.

The above ingredients are dry mixed for seven minutes, and a sufficient quantity of water is added to bring the volume of water present to 5% v/v. 0.001 parts v/v AIR ENTRAINMENT® brand of air entraining resin is then added according to the manufacturer's directions. The moist mixture is then extruded through a two inch extrusion orifice under 4,000 psi pressure.

EXAMPLE 2

A cementitious composition is prepared by mixing the following components under the following conditions:
4 parts v/v of C-type fly ash that has been de-limed.
4 parts v/v lime.
9 parts v/v Portland cement.
6 parts v/v play sand.
24 parts v/v micronized polystyrene loam particles.

The above ingredients are dry mixed for seven minutes, and a sufficient quantity of water is added to bring the volume of water present to 1% v/v. 0.001 parts v/v AIR ENTRAINMENT® brand of air entraining resin is then added according to the manufacturer's directions. The moist mixture is then molded under 4,000 psi pressure and after three minutes ejected from the mold.

EXAMPLE 3

A cementitious composition is prepared by mixing the following components under the following conditions:
4 parts v/v of C-type fly ash that has been de-limed.
4 parts v/v lime.
9 parts v/v Portland cement.
6 parts v/v play sand.
24 parts v/v micronized polystyrene loam particles.

The above ingredients are dry mixed for seven minutes, and a sufficient quantity of water is added to bring the volume of water present to 0.5% v/v. 0.001 parts v/v AIR ENTRAINMENT® brand of air entraining resin is then added according to the manufacturer's directions. The moist mixture is then extruded through a two inch extrusion orifice under 4,000 psi pressure.

EXAMPLE 4

A cementitious composition is prepared by mixing the following components under the following conditions:
4 parts v/v of F-type fly ash.
9 parts v/v Portland cement.
6 parts v/v play sand.
24 parts v/v micronized polystyrene foam particles.

The above ingredients are dry mixed for seven minutes, and a sufficient quantity of water is added to bring the volume of water present to 0.005% v/v. 0.001 parts v/v AIR ENTRAINMENT® brand of air entraining resin is then added according to the manufacturer's directions. The moist mixture is then extruded through a two inch extrusion orifice under 4,000 psi pressure.

EXAMPLE 5

A cementitious composition is prepared by mixing the following components under the following conditions:
3 parts v/v of F-type fly ash.
10 parts v/v Portland cement.
6 parts v/v play sand.
24 parts v/v micronized polystyrene foam particles.

The above ingredients are dry mixed for seven minutes, and a sufficient quantity of water is added to bring the volume of water present to 5% v/v. 0.001 parts v/v AIR ENTRAINMENT® brand of air entraining resin is then added according to the manufacturer's directions. The moist mixture is then extruded through a two inch extrusion orifice under 4,000 psi pressure.

EXAMPLE 6

A cementitious composition was prepared by mixing the following components under the following conditions:
3 parts v/v of F-type fly ash.
10 parts v/v Portland cement.
6 parts v/v play sand.
24 parts v/v micronized polystyrene foam particles.
1 part v/v fiberglas strands.

The above ingredients were dry mixed for five minutes, and a sufficient quantity of water was added to bring the volume of water present to 5% v/v. 0.001 parts AIR ENTRAINMENT® brand of air entraining resin was then added according to the manufacturer's directions. The moist mixture was then molded under 4,000 psi pressure and ejected from the mold after three minutes. After drying, the resulting material yielded the following strength tests, in psi measured at the indicated time interval post drying:
7 days: 2,000 psi

EXAMPLE 7

A cementitious composition was prepared by mixing the following components under the following conditions:
3 parts v/v of F-type fly ash.
10 parts v/v Portland cement.
6 parts v/v play sand.
24 parts v/v micronized polystyrene foam particles.
1 part v/v fiberglas strands.

The above ingredients were dry mixed for five minutes, and a sufficient quantity of water was added to bring the volume of water present to 2% v/v. 0.001 parts v/v AIR ENTRAINMENT® brand of air entraining resin was then added according to the manufacturer's directions. The moist mixture was then molded under 4,000 psi pressure. After drying, the resulting material yielded the following strength tests, in psi measured at the indicated time intervals post drying:
7 days 2,000 psi

EXAMPLE 8

A cementitious composition was prepared by mixing the following components under the following conditions:
3 parts v/v of F-type fly ash.
10 parts v/v Portland cement.
6 parts v/v play sand.
24 parts v/v micronized polystyrene loam particles.
1 part v/v fiberglas strands.

The above ingredients were dry mixed for five minutes, and a sufficient quantity of water was added to bring the volume of water present to 0.05% v/v. 0.001 parts AIR ENTRAINMENT® brand of air entraining resin was then added according to the manufacturer's directions. The moist mixture was then molded under 4,000 psi pressure. After drying, the resulting material yielded the following strength tests, in psi measured at the indicated time interval post drying:
7 days 2,000 psi

EXAMPLE 9

A cementitious composition is prepared by mixing the following components under the following conditions:
0.5 lb. of F-type fly ash.
20.2 lb. of Portland cement.
46 lb. of play sand.
30 lb. of 0.75 inch aggregate rock
0.5 lb. micronized polystyrene foam particles.

The above ingredients are dry mixed for five minutes, and a sufficient quantity of water is added to bring the volume of water present to 0.05% v/v. The moist mixture is then extruded through a two inch extrusion orifice under 5,000 psi pressure.

EXAMPLE 10

A cementitious composition is prepared by mixing the following components under the following conditions:
0.75 parts v/v of C-type fly ash.
1 part v/v of Portland cement.
1 part v/v of silica sand.
3 parts v/v of micronized polystyrene foam particles.

The above ingredients are dry mixed for seven minutes, and a sufficient quantity of water is added to bring the volume of water present to 6% v/v. The moist mixture is then extruded through a two inch extrusion orifice under 2,000 psi pressure.

EXAMPLE 11

A cementitious composition is prepared by mixing the following components under the following conditions:
0.25 parts v/v of C-type fly ash that has been de-limed.
0.5 v/v parts lime.
1 part v/v of Portland cement.
1 part v/v clay aggregate
4 parts v/v of polystyrene loam beads.

The above ingredients are dry mixed for seven minutes, and a sufficient quantity of water is added to bring the volume of water present to 5% v/v. The moist mixture is then extruded through a two inch extrusion orifice under 500 psi pressure.

EXAMPLE 12

A cementitious composition is prepared by mixing the following components under the following conditions:
0.25 parts v/v C-type fly ash that has been de-limed.
0,5 parts v/v lime.
1 part v/v Portland cement.
1 part v/v silica sand.
4 parts v/v of polystyrene beads.

The above ingredients are dry mixed for seven minutes and a sufficient quantity of water is added to bring the volume of water present to 1% v/v. The moist mixture is then extruded through a two inch extrusion orifice under 3,500 psi pressure.

EXAMPLE 13

A cementitious composition was prepared by mixing the following components under the following conditions:
0.25 parts v/v of C-type fly ash that has been de-limed.
1 part v/v of lime.
1 part v/v of Portland cement.
1 part v/v of clay aggregate.
4 parts v/v of micronized polystyrene foam particles.

The above ingredients are dry mixed for seven minutes, and a sufficient quantity of water is added to bring the volume of water present to 0.075% v/v. The moist mixture is then extruded through a two inch extrusion orifice under 5,000 psi pressure.

EXAMPLE 14

A cementitious composition is prepared by mixing the following components under the following conditions:
0.25 parts v/v C-Type fly ash that has been de-limed.
1 part v/v Portland cement.
0.5 parts lime.
1 part v/v silica sand.
4 parts v/v polystyrene foam beads.

The above ingredients are dry mixed for seven minutes, and a sufficient quantity of water is added to bring the volume of water present to 0.05% v/v. The moist mixture is then extruded through a two inch extrusion orifice under 10,000 psi pressure.

EXAMPLE 15

A cementitious composition is prepared by mixing the following components under the following conditions:
0.25 parts v/v C-type fly ash that has been delimed.
1 part v/v Portland cement.
0.5 parts v/v of lime.
1 part v/v of play sand.
4 parts v/v of polystyrene loam beads.

The above ingredients are dry mixed for seven minutes, and a sufficient quantity of water is added to bring the volume of water present to 0.5% v/v. The moist mixture is then extruded through a two inch extrusion orifice under 4,000 psi pressure.

EXAMPLE 16

A cementitious composition is prepared by mixing the following components under the following conditions:
4 parts v/v of C-type fly ash that has been de-limed.
6 parts v/v of Portland cement.
3 parts v/v of lime.
6 parts v/v of play sand.
24 parts v/v of micronized polystyrene foam particles.

The above ingredients are dry mixed for seven minutes, and a sufficient quantity of water is added to bring the volume of water present to 2% v/v. The moist mixture is then extruded through a two inch extrusion orifice under 2,000 psi pressure

EXAMPLE 17

A cementitious composition is prepared by mixing the following components under the following conditions:
3 parts v/v of C-type fly ash that has been de-limed.
9 parts v/v of Portland cement.
4.5 parts v/v of lime.
12 parts v/v silica sand.
3 parts v/v calcium carbonate.

The above ingredients are dry mixed for seven minutes, and a sufficient quantity of water is added to bring the volume of water present to 0.08% v/v. The moist mixture is then extruded through a one inch extrusion orifice under 4,000 psi pressure.

EXAMPLE 18

A cementitious composition is prepared by mixing the following components under the following conditions:
4 parts v/v of C-type fly ash that has been de-limed.
12 parts v/v of Portland cement.
4.5 parts v/v of lime.
6 parts v/v play sand.
28 parts v/v of micronized polystyrene foam particles.

The above ingredients are dry mixed for five minutes, and a sufficient quantity of water is added to bring the volume of water present to 2% v/v. The moist mixture is then extruded through a three inch extrusion orifice under 8,000 psi pressure.

EXAMPLE 19

A cementitious composition was prepared by mixing the following components under the following conditions:
15 parts v/v of F-type fly ash that has been de-limed.
21 parts v/v of Portland cement.
8 parts v/v of lime.
18 parts v/v play sand.
24 parts v/v of micronized polystyrene foam particles.

The above ingredients were dry mixed for five minutes, and a sufficient quantity of water is added to bring the volume of water present to 1% v/v. The moist mixture is then extruded through a two inch extrusion orifice under 1,000 psi pressure.

EXAMPLE 20

A cementitious composition iss prepared by mixing the following components under the following conditions:
11 parts v/v of C-type fly ash that has been de-limed.
20 parts v/v of Portland cement.
11 parts v/v of lime.
12 parts v/v play sand.
0.6 parts v/v of micronized polystyrene foam particles.

The above ingredients are dry mixed for five minutes, and a sufficient quantity of water is added to bring the volume of water present to 4% v/v. The moist mixture is then extruded through a two inch extrusion orifice under 4,000 psi pressure.

EXAMPLE 21

A cementitious composition was prepared by mixing the following components under the following conditions:
3 parts v/v of C-type fly ash that has been de-limed.
1 part v/v F-type fly ash that has been de-limed.
9 parts v/v of Portland cement.
4 parts v/v of lime.
6 parts v/v play sand.
1 part THERMO-SHIELD® brand of water proofing additive.
24 parts v/v of micronized polystyrene foam particles.

The above ingredients are dry mixed for five minutes, and 9 parts v/v of water are added to the mix. and a sufficient quantity of water is added to bring the volume of water present to 0.5% v/v. The moist mixture is then extruded through a two inch extrusion orifice under 7,000 psi pressure.

EXAMPLE 22

A cementitious composition is prepared by mixing the following components under the following conditions:
3 parts v/v F-type fly ash that has been de-limed.
9 parts v/v of Portland cement.
3 parts v/v of lime.
6 parts v/v silica sand.
0.5 part THERMO-SHIELD® brand of water proofing additive, a water proofing chemical.
12 parts v/v of micronized polystyrene foam particles.
12 parts v/v of polystyrene foam beads.

The above ingredients are dry mixed for five minutes, and a sufficient quantity of water is added to bring the volume of water present to 0.25% v/v. The moist mixture is then extruded through a two inch extrusion orifice under 4,000 psi pressure.

EXAMPLE 23

A cementitious composition is prepared by mixing the following components under the following conditions:
4 parts v/v F-type fly ash..
9 parts v/v of Portland cement.
6 parts v/v sand.
36 parts v/v of micronized polystyrene foam particles.
0.001 part v/v of air entrainment agent.
1 part, v/v of FIBERMESH® brand of fiberglas reinforcement fiber.

The above ingredients are dry mixed for five minutes, and a sufficient quantity of water is added to bring the volume of water present to 0.05% v/v. The moist mixture is then extruded through a two inch extrusion orifice under 10,000 psi pressure.

EXAMPLE 24

A cementitious composition is prepared by mixing the following components under the following conditions:
4 parts v/v F-type fly ash..
9 parts v/v of Portland cement.
6 parts v/v sand.
50 parts v/v of micronized polystyrene foam particles.
0.001 part v/v of air entrainment agent.
1 part v/v of FIBERMESH® brand of fiberglas reinforcement fiber.

The above ingredients are dry mixed for five minutes, and a sufficient quantity of water is added to bring the volume of water present to 3% v/v. The moist mixture is then extruded through a two inch extrusion orifice under 4,000 psi pressure.

EXAMPLE 25

A cementitious composition is prepared by mixing the following components under the following conditions:
4 parts v/v F-type fly ash..
9 parts v/v of Portland cement.
6 parts v/v sand.
36 parts v/v of micronized polystyrene foam particles.
0.001 part v/v of air entrainment agent.
1 part v/v of FIBERMESH® brand of fiberglas reinforcement fiber.

The above ingredients are dry mixed for five minutes, and a sufficient quantity of water is added to bring the volume of water present to 1% v/v. The moist mixture is then extruded through a two inch extrusion orifice under 3,000 psi pressure.

While the invention has been described and illustrated with reference to certain preferred embodiments thereof, those skilled in the art will appreciate that various changes, modifications and substitutions can be made therein without departing from the spirit and scope of the invention. It is intended, therefore, that the invention be limited only by the scope of the claims which follow and that such claims be interpreted as broadly as is reasonable.

What is claimed is:

1. A load bearing cementitious product comprising:
    (a) from 40 to 99% by volume of an aqueous cementitious mixture;
    (b) from 1 to 60% by volume of micronized polystyrene foam particles; and
    (c) a borate insect repellent;
    said cementitious product having an overall water content of from 0.005% to 10% by volume.

2. The cementitious product as claimed in claim 1, wherein said water content is from 0.005% to 5% by volume.

3. The cementitious product as claimed in claim 1, wherein said water content is from 0.005% to 2% by volume.

4. The cementitious product as claimed in claim 1, wherein said micronized polystyrene foam particles have irregular surfaces.

5. The cementitious product as claimed in claim 1, wherein said micronized polystyrene foam particles are a coarse powder.

6. The cementitious product as claimed in claim 1, wherein said micronized polystyrene foam particles have an average diameter of approximately 1 to 5000 microns.

7. The cementitious product as claimed in claim 1, wherein said micronized polystyrene foam particles have an average diameter of approximately 50 to 2000 microns.

8. The cementitious product as claimed in claim 1, wherein said micronized polystyrene foam particles have an average diameter of approximately 600 to 1200 microns.

9. The cementitious product as claimed in claim 1, wherein said micronized polystyrene foam particles have an average diameter of approximately 800 microns.

10. The cementitious product as claimed in claim 1, wherein said aqueous cementitious mixture comprises a hydraulic cement.

11. The cementitious product as claimed in claim 1, wherein said aqueous cementitious mixture comprises a portland cement.

12. The cementitious product as claimed in claim 1, wherein said aqueous cementitious mixture comprises lime.

13. The cementitious product as claimed in claim 1, wherein said aqueous cementitious mixture includes an air entrainment agent.

14. The cementitious product as claimed in claim 1, wherein said aqueous cementitious mixture comprises fly ash.

15. The cementitious product as claimed in claim 1, wherein said aqueous cementitious mixture comprises Class C fly ash.

16. The cementitious product as claimed in claim 1, wherein said aqueous cementitious mixture comprises Class F fly ash.

17. The cementitious product as claimed in claim 1, wherein said aqueous cementitious mixture comprises de-limed fly ash.

18. The cementitious product as claimed in claim 1, wherein said aqueous cementitious mixture includes sand.

19. The cementitious product as claimed in claim 1, wherein said aqueous cementitious mixture includes fiberglass reinforcing fibers.

20. A method of preparing a lightweight cementitious product comprising the steps of:
   (a) shredding polystyrene containing a borate insect repellant; and having an approximate density of 1 lb/ft$^3$ to form micronized polystyrene foam particles;
   (b) forming a cementitious mixture suitable for undergoing a hydration reaction in the presence of water;
   (c) dispersing said foam particles into said cementitious mixture;
   (d) adding a sufficient quantity of water to result in a product having a volume of water present of from 0.005% to 5%;
   (e) compressing the product of step (d) under high pressure of from 500 to 5,000 lb/in$^2$.

21. The method as claimed in claim 20, wherein said compression step comprises extruding the product of step (d) through an extrusion means under pressure.

22. The method as claimed in claim 20, wherein said compression step comprises molding the product of step (d) in a mold under pressure.

23. A product as claimed in claim 1 wherein said product is a roof tile.

24. A product as claimed in claim 1, wherein said product is a paver.

25. A product as claimed in claim 1, wherein said product is a chimney stack.

26. A product as claimed in claim 1, wherein said product is a brick.

27. A product as claimed in claim 1, wherein said product is a fire brick.

28. A product as claimed in claim 1, wherein said product is a block for landscape retaining walls.

29. A product as claimed in claim 1, wherein said product is a prestressed concrete wall.

30. A product as claimed in claim 1, wherein said product is a tilt-up wall.

31. The cementitious product as claimed in claim 1, having a density of from 60 to 115 lb/ft$^3$.

32. The cementitious product as claimed in claim 1, having a density of from 70 to 90 lb/ft$^3$.

33. The cementitious product as claimed in claim 1, whereas said cementitious mixture is present in a range of from 40 to 75% by volume and said micronized polystyrene foam particles are present in a range of from 25 to 60% by volume.

34. The cementitious product as claimed in claim 1, whereas said cementitious mixture is present in a range of from 50 to 60% by volume and said micronized polystyrene foam particles are present in a range of from 40 to 50% by volume.

35. A produce as claimed in claim 1, wherein said product is a roof paver.

* * * * *